US010774278B2

(12) United States Patent
Yonemura et al.

(10) Patent No.: US 10,774,278 B2
(45) Date of Patent: Sep. 15, 2020

(54) CO SHIFT CATALYST, CO SHIFT REACTION APPARATUS, AND METHOD FOR PURIFYING GASIFIED GAS

(71) Applicant: MITSUBISHI HEAVY INDUSTRIES, LTD., Tokyo (JP)

(72) Inventors: Masanao Yonemura, Tokyo (JP); Toshinobu Yasutake, Tokyo (JP); Akihiro Sawata, Tokyo (JP); Yoshio Seiki, Tokyo (JP); Yukio Tanaka, Tokyo (JP); Koji Higashino, Tokyo (JP); Hyota Abe, Tokyo (JP); Kaori Yoshida, Tokyo (JP)

(73) Assignee: MITSUBISHI HEAVY INDUSTRIES ENGINEERING, LTD., Yokohama-shi (JP)

( * ) Notice: Subject to any disclaimer, the term of this patent is extended or adjusted under 35 U.S.C. 154(b) by 0 days.

(21) Appl. No.: 15/617,193

(22) Filed: Jun. 8, 2017

(65) Prior Publication Data
US 2017/0267939 A1    Sep. 21, 2017

Related U.S. Application Data

(63) Continuation of application No. 14/769,519, filed as application No. PCT/JP2013/055250 on Feb. 27, 2013.

(51) Int. Cl.
*C10K 3/04*    (2006.01)
*B01J 23/88*   (2006.01)
(Continued)

(52) U.S. Cl.
CPC ............. *C10K 3/04* (2013.01); *B01J 23/6525* (2013.01); *B01J 23/74* (2013.01); *B01J 23/755* (2013.01);
(Continued)

(58) Field of Classification Search
CPC .... B01J 23/8906; B01J 23/883; B01J 23/755; B01J 23/6525
See application file for complete search history.

(56) References Cited

U.S. PATENT DOCUMENTS 3,850,841 A   11/1974  Aldridge et al.
5,039,503 A    8/1991  Sauvion et al.
(Continued)

FOREIGN PATENT DOCUMENTS

CN    1154271 A    7/1997
CN  102225339 A   10/2011
(Continued)

OTHER PUBLICATIONS

International Search Report dated Mar. 26, 2013, issued in counterpart International Application No. PCT/JP2013/055250 (4 pages).
(Continued)

*Primary Examiner* — Matthew J Merkling
(74) *Attorney, Agent, or Firm* — Westerman, Hattori, Daniels & Adrian, LLP

(57) ABSTRACT

A CO shift catalyst according to the present invention reforms carbon monoxide (CO) in gas. The CO shift catalyst has one of molybdenum (Mo) or iron (Fe) as a main component and has an active ingredient having one of nickel (Ni) or ruthenium (Ru) as an accessory component and one or two or more kinds of oxides from among titanium (Ti), zirconium (Zr), and cerium (Ce) for supporting the active ingredient as a support. The temperature at the time of manufacturing and firing the catalyst is equal to or higher than 550° C.

3 Claims, 2 Drawing Sheets

(51) Int. Cl.

| | |
|---|---|
| C10K 1/08 | (2006.01) |
| C10K 1/00 | (2006.01) |
| C01B 3/16 | (2006.01) |
| C10J 3/00 | (2006.01) |
| C10K 1/02 | (2006.01) |
| C10K 1/10 | (2006.01) |
| B01J 23/652 | (2006.01) |
| B01J 23/74 | (2006.01) |
| B01J 23/883 | (2006.01) |
| B01J 23/89 | (2006.01) |
| B01J 23/755 | (2006.01) |
| B01J 35/02 | (2006.01) |
| B01J 37/00 | (2006.01) |
| B01J 37/08 | (2006.01) |
| C10J 3/02 | (2006.01) |
| B01J 23/00 | (2006.01) |
| B01J 35/10 | (2006.01) |

(52) U.S. Cl.
CPC ............ *B01J 23/88* (2013.01); *B01J 23/883* (2013.01); *B01J 23/89* (2013.01); *B01J 23/892* (2013.01); *B01J 23/8906* (2013.01); *B01J 35/023* (2013.01); *B01J 37/0036* (2013.01); *B01J 37/08* (2013.01); *C01B 3/16* (2013.01); *C10J 3/00* (2013.01); *C10J 3/02* (2013.01); *C10K 1/004* (2013.01); *C10K 1/005* (2013.01); *C10K 1/024* (2013.01); *C10K 1/08* (2013.01); *C10K 1/10* (2013.01); *B01J 23/002* (2013.01); *B01J 35/1014* (2013.01); *B01J 35/1019* (2013.01); *B01J 2523/00* (2013.01); *C01B 2203/0283* (2013.01); *C01B 2203/049* (2013.01); *C01B 2203/0415* (2013.01); *C01B 2203/0465* (2013.01); *C01B 2203/0475* (2013.01); *C01B 2203/0485* (2013.01); *C01B 2203/061* (2013.01); *C01B 2203/068* (2013.01); *C01B 2203/1041* (2013.01); *C01B 2203/1047* (2013.01); *C01B 2203/1058* (2013.01); *C01B 2203/84* (2013.01); *C10J 2300/093* (2013.01); *C10J 2300/0959* (2013.01); *C10J 2300/1653* (2013.01); *C10J 2300/1678* (2013.01); *C10K 1/003* (2013.01); *Y02E 20/16* (2013.01); *Y02E 20/18* (2013.01); *Y02P 20/52* (2015.11)

(56) References Cited

U.S. PATENT DOCUMENTS

| | | |
|---|---|---|
| 8,828,339 B2 | 9/2014 | Yasutake et al. |
| 2003/0007912 A1 | 1/2003 | Silver |
| 2004/0177556 A1 | 9/2004 | Hagemeyer et al. |
| 2004/0180784 A1 | 9/2004 | Hagemeyer et al. |
| 2007/0249496 A1* | 10/2007 | Wagner .................. B01J 23/10 502/303 |
| 2012/0294789 A1 | 11/2012 | Yasutake et al. |

FOREIGN PATENT DOCUMENTS

| | | |
|---|---|---|
| EP | 2 939 739 A1 | 11/2015 |
| EP | 2 939 740 A1 | 11/2015 |
| EP | 2939738 A1 | 11/2015 |
| JP | 8-173809 A | 7/1996 |
| JP | 2004-530618 A | 10/2004 |
| JP | 2004-331701 A | 11/2004 |
| JP | 2006-511427 A | 4/2006 |
| JP | 2008-155181 A | 7/2008 |
| JP | 2011-157486 A | 8/2011 |
| JP | 2012-66237 A | 4/2012 |
| JP | 2013-173898 A | 9/2013 |
| WO | 2011/105501 A1 | 9/2011 |
| WO | 2012/037164 A1 | 3/2012 |

OTHER PUBLICATIONS

Written Opinion of the International Searching Authority dated Mar. 26, 2013, issued in counterpart International Application No. PCT/JP2013/055250 (5 pages).

Laniecki et al., "Water-gas shift reaction over sulfided molybdenum catalysts supported on TiO2-ZrO2 mixed oxides, Support characterization and catalytic activity", Catalysis Today, 2006, pp. 400-407, vol. 116, cited in the ISR.

Laniecki et al., "Water-gas shift reaction over sulfided molybdenum catalysts I. Alumina, titania and zirconia-supported catalysts", Applied Catalysis A: General, 2000, pp. 293-303, vol. 196, cited in the ISR.

Laniecki, "Ni—Mo—Y Zeolites as Catalysts for the Water-Gas Shift Reaction", Studies in Surface Science and Catalysis, 1994, pp. 363-370, vol. 83, cited in the ISR.

Translation of Written Opinion dated Mar. 26, 2013, issued in counterpart International Application No. PCT/JP2013/055250 (5 pages).

Office Action dated Jan. 19, 2016, issued in counterpart Japanese Patent Application No. 2015-502632, with English translation (13 pages).

Extended (Supplementary) European Search Report dated Mar. 2, 2016, issued in counterpart European Patent Application No. 13876420.4 (11 pages).

Decision of a Patent Grant dated Aug. 9, 2016, issued in counterpart Japanese Application No. 2015-502632, with English translation (5 pages).

Notice of Acceptance dated Dec. 6, 2016, issued in counterpart Australian Patent Application No. 2013380071 (3 pages).

* cited by examiner

CO SHIFT CATALYST, CO SHIFT REACTION APPARATUS, AND METHOD FOR PURIFYING GASIFIED GAS

CROSS-REFERENCE TO RELATED APPLICATIONS

This application is a Continuation of application Ser. No. 14/769,519, filed Aug. 21, 2015, wherein application Ser. No. 14/769,519 is a national stage application filed under 35 USC § 371 of International Application No. PCT/JP2013/055250, filed Feb. 27, 2013. The contents of application Ser. No. 14/769,519 is incorporated herein by reference in its entirety.

FIELD

The present invention relates to a CO shift catalyst for converting CO in gasified gas into $CO_2$, a CO shift reaction apparatus, and a method for purifying the gasified gas.

BACKGROUND

The efficient use of coal has attracted attention as one of trumps to solve a recent energy problem.

On the other hand, it is necessary to have an advanced technique such as a coal gasifying technique and a gas purifying technique in order to convert the coal as an energy medium with high added value.

An integrated coal gasification combined power generation system which generates power by using the gasified gas has been proposed (Patent Literature 1).

The integrated coal gasification combined power generation (Integrated coal Gasification Combined Cycle: IGCC) is a system for converting the coal into combustible gas by a high-temperature high-pressure gasification furnace and performing combined power generation by a gas turbine and a steam turbine using the gasified gas as a fuel.

For example, most of hydrocarbon compounds existing in coal gasified gas (produced gas) are carbon monoxide (CO), and carbon dioxide ($CO_2$) and hydrocarbon ($CH_4$ and CnHm) only account for a few percent. As a result, it is necessary to convert CO existing in the produced gas into $CO_2$ in order to recover $CO_2$. It has been proposed to convert CO into $CO_2$ by the following reaction by using the CO shift catalyst while adding water vapor ($H_2O$) (Patent Literature 2).

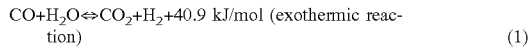

$$CO + H_2O \Leftrightarrow CO_2 + H_2 + 40.9 \text{ kJ/mol (exothermic reaction)} \quad (1)$$

According to the knowledge to relative to the shift reaction in the field of chemical industry before, by sufficiently increasing a water vapor adding ratio ($H_2O$/CO) at a CO shift reactor inlet, the above-mentioned reaction of (1) is proceeded, and a desired CO→$CO_2$ conversion rate can be obtained.

CITATION LIST

Patent Literature

Patent Literature 1: Japanese Laid-open Patent Publication No. 2004-331701
Patent Literature 2: Japanese Laid-open Patent Publication No. 2011-157486

SUMMARY

Technical Problem

For example, a Co—Mo/$Al_2O_3$ catalyst is generally used as the CO shift catalyst. However, the Co—Mo/$Al_2O_3$ catalyst is activated in a high temperature region (for example, equal to or higher than 350° C.). Therefore, a carbon (C) deposition is concerned.

Therefore, to prevent the C deposition, it has been necessary to add an excessive amount of water vapor (water vapor ($H_2O$)/CO≥3).

On the other hand, the IGCC plant including a $CO_2$ recovery facility is a power generation plant, and it is necessary to consider environment (reduce $CO_2$ emission). Also, it is necessary to focus on a plant power generation efficiency.

That is, for example, extraction medium pressure steam from a heat recovery steam generator (HRSG) is used as a water vapor adding source for water vapor adding ratio ($H_2O$/CO) while supplying it to a shift reactor. However, reduction in the amount of the extraction water vapor is an important factor to improve the plant efficiency. Therefore, to reduce the amount of the extraction water vapor from the heat recovery steam generator (HRSG) is required as much as possible in order to increase the power generation efficiency.

Therefore, the appearance of the CO shift catalyst is desired which can improve durability to the C deposition and can stably perform the CO shift conversion for a long time even when the supply amount of the water vapor has been largely reduced from "water vapor ($H_2O$/CO)=3" to about "water vapor ($H_2O$/CO)=1".

A purpose of the present invention is to provide a CO shift catalyst, a CO shift reaction apparatus, and a method for purifying gasified gas which can stably and efficiently perform CO shift reaction and of which the catalyst is not drastically deteriorated even when the amount of the water vapor is small in consideration of the above problem.

Solution to Problem

The first invention of the present invention to solve the above problems, is a method of producing a CO shift catalyst which reforms carbon monoxide (CO) in gas comprising: obtaining a complex oxide including titanium (Ti) and silicon (Si) as a support; and then supporting active ingredients including molybdenum (Mo) or iron (Fe) as a main component and nickel (Ni) or ruthenium (Ru) as an accessory component on the support of the complex oxide; and then firing them to obtain the CO shift catalyst at a high temperature from 550° C. to 800° C. to obtain a crystal structure of an anatase type.

The second invention is the CO shift catalyst according to the first invention, a support amount of the main component of the active ingredient is 0.1 to 25 percent by weight, and a support amount of the accessory component is 0.01 to 10 percent by weight.

The third invention is a CO shift reaction apparatus which is formed by filling the CO shift catalyst according to the first and second invention into a reaction tower.

The fourth invention is a method for purifying gasified gas, comprising: after smoke and dust in gasified gas obtained by a gasification furnace have been removed by a filter, further clarifying the gasified gas after a CO shift reaction by a wet scrubber apparatus; subsequently removing carbon dioxide and hydrogen sulfide in the gasified gas;

and obtaining purified gas by performing the CO shift reaction for converting CO in the gasified gas into $CO_2$ by using the CO shift catalyst according to the first and second invention.

Advantageous Effects of Invention

The CO shift catalyst according to the present invention has a large average pore diameter of the catalyst. Therefore, even when the carbon (C) deposition occurs, the CO shift catalyst has an effect to have an excellent durability and to stably maintain the CO shift reaction for a long time.

DESCRIPTION OF EMBODIMENTS

The present invention will be described in detail below with reference to the drawings. The present invention is not limited to the embodiment below. Also, components of the embodiment below include a component that a person skilled in the art could have easily arrived at, and a component which is substantially identical to the components of the embodiment, that is, a component in the equivalent range. In addition, the components disclosed in the embodiment below can be appropriately combined with each other.

Embodiment

Figure 1:
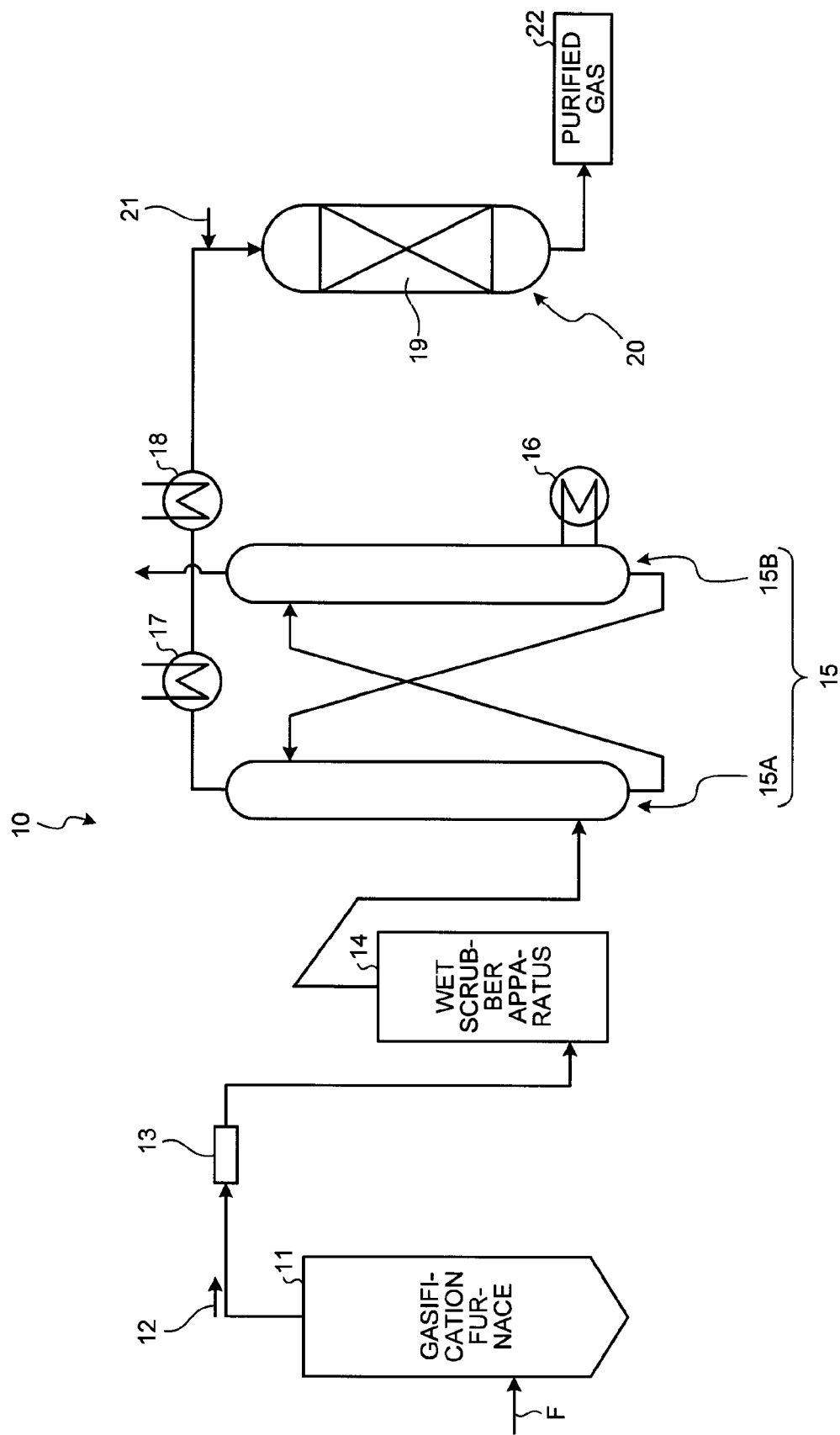
FIG. 1 is a schematic diagram of a gasified gas purifying system including a CO shift reaction apparatus in which a CO shift catalyst has been filled according to the present embodiment.

A CO shift catalyst according to an embodiment of the present invention and a CO shift reaction apparatus using the same will be described with reference to the drawings. FIG. 1 is a schematic diagram of a gasified gas purifying system including the CO shift reaction apparatus in which the CO shift catalyst has been filled.

As illustrated in FIG. 1, a gasified gas purifying system 10 includes a gasification furnace 11 for gasifying coal which is a fuel F, a filter 13 for removing smoke and dust in gasified gas 12 which is produced gas, a wet scrubber apparatus 14 for removing halogen in the gasified gas 12 which has passed through the filter 13, a gas purifying apparatus 15, a first heat exchanger 17 and a second heat exchanger 18 which increase the temperature of the gasified gas 12, a CO shift reaction apparatus 20 including a CO shift catalyst 19 for converting CO in the gasified gas 12 of which the temperature is increased at, for example, 300° C. into $CO_2$ and making it to be purified gas 22. The gas purifying apparatus 15 includes an absorber 15A for absorbing and removing $CO_2$ and $H_2S$ in the heat-exchanged gasified gas 12 and a regenerator 15B for regenerating them. Also, the gas purifying apparatus 15 has a regeneration superheater 16 on a side of the regenerator 15B. A reference sign 21 indicates water vapor in FIG. 1.

In the gasification furnace 11, the coal which is the fuel F has contact with a gasification agent such as air and oxygen so that the coal is burned and gasified. Accordingly, the gasified gas 12 is generated. The gasified gas 12 generated in the gasification furnace 11 has carbon monoxide (CO), hydrogen ($H_2$), and carbon dioxide ($CO_2$) as main components. However, a small amount of an element included in the coal (for example, a halogen compound and a heavy metal such as mercury (Hg)) and a small amount of an unburned compound at the time of coal gasification (for example, polycyclic aromatic such as phenol and anthracene, cyanogen, and ammonia) are included.

The gasified gas 12 generated in the gasification furnace 11 is introduced from the gasification furnace 11 to the filter 13. In the gasified gas 12 introduced to the filter 13, smoke and dust are removed from the gasified gas 12. A cyclone, an electrostatic precipitator (EP), and the like may be used other than the filter.

After the filter 13 has removed smoke and dust, the gasified gas 12 is purified by the gas purifying apparatus 15. After that, the temperature of the gasified gas 12 is increased by the first and second heat exchangers 17 and 18.

Subsequently, after the water vapor 21 has been supplied by a water vapor supplying apparatus (water vapor supplying unit), the water vapor 21 is introduced to the CO shift reaction apparatus 20 having the CO shift catalyst 19. The CO shift reaction apparatus 20 reforms carbon monoxide (CO) in the gasified gas 12 and converts it into carbon dioxide ($CO_2$) under the CO shift catalyst 19.

The CO shift catalyst 19 according to the present invention is the CO shift catalyst for reforming carbon monoxide (CO) in the gasified gas and has an active ingredient including molybdenum (Mo) or iron (Fe) as the main component and nickel (Ni) or ruthenium (Ru) as an accessory component and a complex oxide including two or more kinds from among titanium (Ti), zirconium (Zr), cerium (Ce), silica (Si), aluminum (Al), and lanthanum (La) for supporting the active ingredient as the support. The CO shift catalyst 19 is formed by firing them at a high temperature of equal to or more than 550° C., more preferably, equal to or more than 600° C.

As an exemplary complex oxide of the support, $TiO_2$—$SiO_2$, $TiO_2$—$ZrO_2$, $TiO_2$—$Al_2O_3$, $ZrO_2$—$Al_2O_3$, $TiO_2$—$CeO_2$, and $TiO_2$—$La_2O_3$ are used.

Also, the firing temperature of the support is of 500° C. which is the normal firing temperature to equal to or higher than 550° C., and more preferably, equal to or higher than 600° C., More preferably, the firing at a high temperature which is equal to or higher than 700° C. is performed for a predetermined time.

It is preferable that the upper limit of the firing temperature be equal to or lower than 850° C. At 850° C., a crystal structure of the support is changed from an anatase type to a rutile type.

Also, it is preferable that the firing time be at least equal to or longer than one hour and preferably equal to or longer than two hours. More preferably, it is preferable that the firing time be equal to or longer than three hours.

In the present invention, the temperature of the catalyst firing is equal to or higher than 550° C. that is higher than the normal temperature of 500° C. Therefore, when the CO shift catalyst according to the present invention is used, an initial CO conversion rate becomes slightly smaller than that of the catalyst fired at 500° C. However, for example, the CO conversion rate after a hundred-hour durability test becomes higher than that of the catalyst fired at 500° C. The CO conversion rate after a hundred-hour durability test becomes higher because a carbon production reaction can be prevented due to the reduction in a specific surface area by firing at the high temperature.

Here, it is preferable that a support amount of molybdenum (Mo) or iron (Fe) which is the main component be 0.1 to 25 percent by weight, and more preferably, 7 to 20 percent by weight. It is preferable that a support amount of nickel (Ni) or ruthenium (Ru) which is the accessory component be 0.01 to 10 percent by weight, and more preferably, 2 to 10 percent by weight.

In this way, according to the CO shift catalyst 19 of the present invention, a CO shift conversion can be stably performed for a long time. Also, the amount of the water vapor to be supplied is reduced, and an efficient gas purifying process can be provided.

[Example of Test]

An example of a test indicating an effect of the present invention will be described below.

1) Manufacturing Method for Test Catalyst 1

After a Ti source which is $TiOSO_4$ of 320.2 g has been mixed with water of 1441.8 g at a normal temperature, "SNOWTEX® O(product name)" (silica sol, $SiO_2$=20 wt. %) of 200 g manufactured by Nissan Chemical Industries, Ltd. is mixed. After that, $NH_4OH$ having 9 vol. % is slowly dripped, and pH in the mixed liquid is made to be seven. Then, a deposit is generated, and the mixed liquid is stirred for two more hours and matured. After being filtered and sufficiently cleaned, the deposit obtained after maturing is dried and fired (for five hours at 500° C.). Accordingly, the support is obtained.

Relative to the support, NiO and $MoO_3$ are added so that four percent by weight of NiO and 14 percent by weight of $MoO_3$ are supported relative to an amount of all powders which are finally obtained. After that, they are evaporated, dried, and impregnated on a ceramic dish. Then, after the obtained powder has been completely dried by a dryer, the powder catalyst is obtained by firing the obtained powder at 550° C. for three hours (temperature rising speed 100° C/h).

After the powder of the obtained powder catalyst has been fixed by a pressure molding apparatus of 30 ton, the power is crushed so that the particle size becomes within a range of a predetermined particle size (for example, 2 to 4 mm) and sieved. Accordingly, a test catalyst 1 is obtained.

Also, after the power is dried as mentioned above, the powder catalyst is obtained by firing at 600° C., 700° C., and then, 800° C. After that, an operation similar to that for manufacturing the test catalyst 1 is performed, and the test catalyst 1 having a different firing temperature is obtained.

2) Manufacturing Method for Test Catalyst 2

In the manufacture for the test catalyst 1, $ZrOCl_2$ corresponding to 40 g in terms of $ZrO_2$ is used instead of a $SiO_2$ source as the support. Other than that, the operation similar to that for manufacturing the test catalyst 1 is performed, and accordingly, the test catalyst 2 is obtained.

3) Manufacturing Method for Test Catalyst 3

In the manufacture for the test catalyst 1, $Al(NO_3)_3 \cdot 9H_2O$ corresponding to 40 g in terms of $Al_2O_3$ is used instead of the $SiO_2$ source as the support. Other than that, the operation similar to that for manufacturing the test catalyst 1 is performed, and accordingly, the test catalyst 3 is obtained.

4) Manufacturing Method for Comparison Catalysts 1 to 3

In the test catalysts 1 to 3, the firing temperature of the support is assumed to be 500° C. Other than that, the comparison catalysts 1 to 3 are obtained by similarly performing the operation.

The catalyst is evaluated as follows.

Regarding the evaluation test, the catalyst of 3.3 cc is filled in a tubular reaction tube, and a catalytic activity is evaluated by a circulation type micro-reactor apparatus. The inside diameter of the tubular reaction tube is 14 mm.

The initial catalytic activity is compared by obtaining the CO conversion rates of gas flow rate change of an inlet and outlet of a catalyst layer.

The initial activity evaluation condition and the activity evaluation condition after durability are as follows.

The test is performed under the condition of 0.9 MPa, the temperature 250° C., SV=6, 000$^{-1}$ while assuming that a gas composition be $H_2/CO/CO_2$=30/50/20 mole percent, $H_2S$=700 ppm, and S/CO=1.0.

The CO conversion rate is obtained according to the following formula (I).

CO conversion rate (%)=(1−(CO gas flow velocity at outlet of catalyst layer (mol/time))/(CO gas flow velocity at inlet of catalyst layer (mol/time)))×100  (I)

Also, the durability (acceleration) test is performed under the condition below.

The test is performed under the condition that 0.9 MPa, the temperature 450° C., SV=2, and 000h$^{-1}$ while assuming that a gas composition be $H_2/CO/CO_2$=30/50/20 mole percent, $H_2S$=700 ppm, and S/CO=0.1.

A list of the composition of the catalyst and the result of the test are illustrated in Table 1.

TABLE 1

| | ACTIVE INGREDIENT | | | | | | |
|---|---|---|---|---|---|---|---|
| | METAL | SUPPORT AMOUNT (wt %) | METAL | SUPPORT AMOUNT (wt %) | SUPPORT | WEIGHT RATIO | FIRING TEMPERATURE (° C. × 3 h) |
| TEST CATALYST 1 | Mo | 14 | Ni | 4 | $TiO_2$—$SiO_2$ | 80:20 | 550 600 700 800 |
| TEST CATALYST 2 | ↑ | ↑ | ↑ | ↑ | $TiO_2$—$ZrO_2$ | 80:20 | 550 600 700 800 |
| TEST CATALYST 3 | ↑ | ↑ | ↑ | ↑ | $TiO_2$—$Al_2O_3$ | 80:20 | 550 600 700 800 |
| COMPARISON CATALYST 1 | ↑ | ↑ | ↑ | ↑ | $TiO_2$—$SiO_2$ | 80:20 | 500 |
| COMPARISON CATALYST | ↑ | ↑ | ↑ | ↑ | $TiO_2$—$ZrO_2$ | 80:20 | 500 |

TABLE 1-continued

| | | | | | | | |
|---|---|---|---|---|---|---|---|
| COMPARISON CATALYST 2 | ↑ | ↑ | ↑ | ↑ | $TiO_2$—$Al_2O_3$ | 80:20 | 500 |

| | AVERAGE PORE DIAMETER (Å) | INITIAL SPECIFIC SURFACE AREA ($m^2/g$) | INITIAL CO CONVERSION RATE (%) | CO CONVERSION RATE AFTER 100 H DURABILITY (%) | C DEPOSITION AMOUNT (wt %) | RATIO OF CO CONVERSION RATE AFTER 100 H DURABLIITY RELATIVE TO INITIAL CO CONVERSION RATE (%) |
|---|---|---|---|---|---|---|
| TEST CATALYST 1 | 72 | 118 | 81.8 | 64 | 0.79 | 78 |
| | 79 | 109 | 81.6 | 63.9 | 0.81 | 78 |
| | 92 | 91 | 80.8 | 64.2 | 0.83 | 79 |
| | 110 | 80 | 79.6 | 63.8 | 0.95 | 80 |
| TEST CATALYST 2 | 161 | 115 | 83.2 | 65.7 | 0.79 | 79 |
| | 178 | 106 | 82.0 | 63.8 | 0.81 | 78 |
| | 225 | 94 | 80.9 | 62.7 | 0.81 | 78 |
| | 250 | 86 | 79.9 | 62.6 | 0.93 | 78 |
| TEST CATALYST 3 | 186 | 111 | 82.3 | 65.4 | 0.8 | 79 |
| | 192 | 101 | 81.6 | 64.1 | 0.83 | 79 |
| | 201 | 89 | 80.2 | 63.7 | 0.87 | 79 |
| | 163 | 78 | 78.2 | 62.2 | 0.97 | 80 |
| COMPARISON CATALYST 1 | 79 | 121 | 83.8 | 62.9 | 1.15 | 75 |
| COMPARISON CATALYST 2 | 78 | 118 | 82.9 | 59.7 | 1.21 | 72 |
| COMPARISON CATALYST 3 | 81 | 112 | 81.7 | 63.2 | 1.18 | 77 |

As illustrated in Table 1, it has been confirmed that the catalysts 1 to 3 according to the example of the test have small reduction in the CO conversion rates after the hundred-hour durability test and that the CO shift reaction is excellently maintained at each high firing temperature.

Also, since the carbon production reaction can be prevented by decreasing the specific surface area by firing at the high temperature, the high CO conversion rate after the hundred-hour durability test can be maintained.

Therefore, the CO shift catalyst according to the test has the complex oxide as the support, and the temperature of firing the support is a high temperature equal to or higher than 600° C. Accordingly, it has been found that the CO shift catalyst has an excellent durability and the CO shift reaction can be stably maintained for a long time even in a case where a carbon (C) deposition occurs.

As described above, the specific surface area is reduced by firing at the high temperature as in the present invention. As a result, the carbon production reaction can be prevented.

<Coal Gasification Power Generation Plant>

Figure 2:
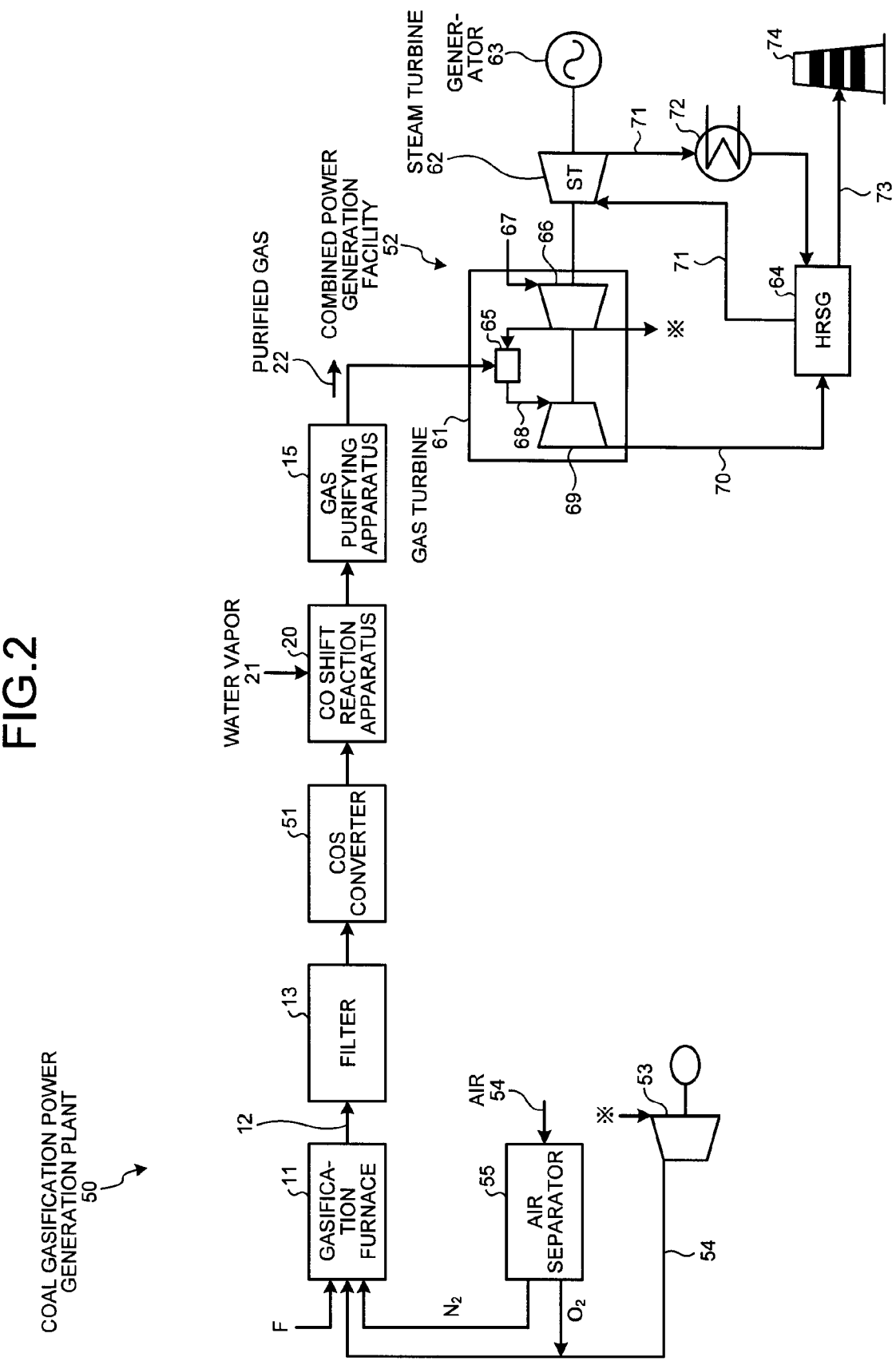
FIG. 2 is a diagram of an exemplary coal gasification power generation plant.

A coal gasification power generation plant having the CO shift reaction apparatus 20 according to the present embodiment will be described with reference to the drawing. FIG. 2 is a diagram of an exemplary coal gasification power generation plant. As illustrated in FIG. 2, a coal gasification power generation plant 50 includes a gasification furnace 11, a filter 13, a COS converter 51, the CO shift reaction apparatus 20, a gas purifying apparatus ($H_2S/CO_2$ recovery unit) 15, and a combined power generation facility 52.

The coal which is a fuel F and air 54 from a gasified air compressor 53 are supplied to the gasification furnace 11, and the coal is gasified by the gasification furnace 11. Then, the gasified gas 12 which is produced gas is obtained. Also, an air separator 55 separates the air 54 into nitrogen ($N_2$) and oxygen ($O_2$), and $N_2$ and $O_2$ are appropriately supplied into the gasification furnace 11. The coal gasification power generation plant 50 supplies the gasified gas 12 obtained by the gasification furnace 11 to the filter 13 and removes dust from the gasified gas 12. After that, the coal gasification power generation plant 50 supplies the gasified gas 12 to the COS converter 51 and converts COS included in the gasified gas 12 into $H_2S$.

After that, the gasified gas 12 including $H_2S$ is supplied to the CO shift reaction apparatus 20, and the water vapor 21 is supplied into the CO shift reaction apparatus 20. A CO shift reaction for converting CO in the gasified gas 12 into $CO_2$ in the CO shift reaction apparatus 20 is caused.

The CO shift reaction apparatus 20 uses the CO shift catalyst 19 according to the present invention. Therefore, even when the amount of the water vapor is largely reduced as described above, reformed gas can be efficiently generated for a long time.

After the CO shift reaction apparatus 20 has converted CO in the gasified gas 12 into $CO_2$, the obtained reformed gas is supplied to the $H_2S/CO_2$ recovery unit which is the gas purifying apparatus 15. Then, the $H_2S/CO_2$ recovery unit removes $CO_2$ and $H_2S$ in the reformed gas.

The purified gas 22 after purified by the gas purifying apparatus 15 is supplied to the combined power generation facility 52. The combined power generation facility includes a gas turbine 61, a steam turbine 62, a generator 63, and a heat recovery steam generator (HRSG) 64. The combined power generation facility 52 supplies the purified gas 22 to a combustor 65 of the gas turbine 61 which is a power generating unit. Also, the gas turbine 61 supplies air 67, which is supplied to the compressor 66, to the combustor 65. The gas turbine 61 generates high-temperature and high-pressure combustion gas 68 by combusting the purified gas 22 by the combustor 65 and drives a turbine 69 by the combustion gas 68. The turbine 69 is coupled to the generator 63, and the generator 63 generates the power by driving the turbine 69. Since flue gas 70 after the turbine 69 has been driven has the temperature of 500 to 600° C., the flue gas 70 is sent to the heat recovery steam generator (HRSG) 64, and heat energy is recovered. The heat recovery steam generator (HRSG) 64 generates steam 71 by the heat energy of the flue gas 70, and the steam turbine 62 is driven by the steam 71. After being used by the steam turbine 62, the steam 71 is discharged from the steam turbine 62 and cooled by the heat exchanger 72. After that, the steam 71 is supplied to the heat recovery steam generator 64. Also, after NOx and the like in the flue gas 73 has been removed by a denitration apparatus (not illustrated) and the like, the flue gas 73 of which the heat energy is recovered by the heat recovery steam generator 64 is discharged into the atmosphere via a stack 74.

In this way, the coal gasification power generation plant 50 having the CO shift reaction apparatus 20 according to the present embodiment converts CO included in the gasified gas gasified by the gasification furnace 11 into $CO_2$ while preventing the deterioration of the CO shift catalyst even when the amount of the water vapor is reduced (water vapor ($H_2O/CO$)=about 1) in the CO shift reaction apparatus 20. Then, the CO shift reaction of the reformed gas can be stably performed for a long time.

Accordingly, regarding the CO shift reaction, the CO shift reaction can be stably continued with small amount of water vapor. Therefore, the amount of the water vapor to be extracted from the HRSG 64 can be reduced, and the coal gasification power generation plant 50 can be operated with an improved energy efficiency.

The CO shift reaction apparatus 20 is not limited to be placed between the COS converter 51 and the gas purifying apparatus ($H_2S/CO_2$ recovery unit) 15 (on the front stream side of $H_2S/CO_2$ recovery unit) and may be placed on the back stream side of the gas purifying apparatus ($H_2S/CO_2$ recovery unit) 15.

Also, in the present embodiment, a case has been described in which the purified gas 22 discharged from the gas purifying apparatus ($H_2S/CO_2$ recovery unit) 15 is used as gas for the turbine. However, since the CO shift reaction apparatus 20 converts a large amount of CO included in the gasified gas 12 into $CO_2$, the purified gas 22 may be used as material gas used to synthesize a chemical product such as methanol and ammonia other than the gas for the turbine.

In the above, a case has been described in which the CO shift reaction apparatus 20 according to the present embodiment converts CO in the gasified gas 12 generated by gasifying the fuel F such as coal by the gasification furnace 11 into $CO_2$. However, the present invention is not limited to this. For example, the present invention can be similarly applied to the CO shift reaction apparatus to convert gas including CO into $CO_2$ in a fuel cell and the like.

REFERENCE SIGNS LIST 10 gasified gas purifying system
11 gasification furnace
12 gasified gas
13 filter
14 wet scrubber apparatus
15A absorber
15B regenerator
15 gas purifying apparatus
19 CO shift catalyst
20 CO shift reaction apparatus
21 water vapor
22 purified gas

The invention claimed is:

1. A method of producing a CO shift catalyst in a CO shift reactor which reforms carbon monoxide (CO) in gas based on a reaction formula below:

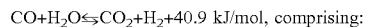

obtaining a complex oxide including titanium (Ti) and silicon (Si) as a support as a first process; and
after obtaining the complex oxide, supporting active ingredients including molybdenum (Mo) or iron (Fe) as a main component and nickel (Ni) or ruthenium (Ru) as an accessory component on the support of the complex oxide as a second process; and
after supporting the active ingredients on the support of the complex oxide, firing them at a high temperature from 550° C. to 800° C. to obtain the CO shift catalyst with a specific surface area thereof being reduced equal to or less than 118m²/g to prevent a carbon production reaction to thereby have a ratio of a CO conversion rate after a hundred-hour durability test to an initial CO conversion rate of 78% or more as a third process in a state wherein a water vapor adding ratio ($H_2O/CO$) which defines an amount of vapor $H_2O$ supplied to the gas at a CO shift reactor inlet of the CO shift reactor satisfies that ($H_2O/CO$) is equal to 1 which represents a state wherein the amount of vapor $H_2O$ supplied to the gas is small, wherein
the first process, the second process, and the third process are performed in this order.

2. The method of producing a CO shift catalyst according to claim 1,
wherein a support amount of the main component of the active ingredient is 0.1 to 25 percent by weight, and a support amount of the accessory component is 0.01 to 10 percent by weight.

3. A method for purifying gasified gas, comprising:
after smoke and dust in gasified gas obtained by a gasification furnace have been removed by a filter,
further removing halogen in the gasified gas by a wet scrubber apparatus after removing the smoke and the dust,
subsequently removing carbon dioxide and hydrogen sulfide in the gasified gas after removing the halogen; and
obtaining purified gas by performing the CO shift reaction for converting CO in the gasified gas after removing the carbon dioxide and the hydrogen sulfide into $CO_2$ by using the CO shift catalyst obtained by the method according to claim 1.

* * * * *